Feb. 8, 1949.　　　　　C. SEIPPEL　　　　　2,461,186
GAS TURBINE INSTALLATION

Filed March 16, 1943　　　　　　　　　　　　2 Sheets—Sheet 1

Inventor:
Claude Seippel

By Pierce & Scheffler
Attorneys.

Feb. 8, 1949.  C. SEIPPEL  2,461,186
GAS TURBINE INSTALLATION
Filed March 16, 1943  2 Sheets-Sheet 2
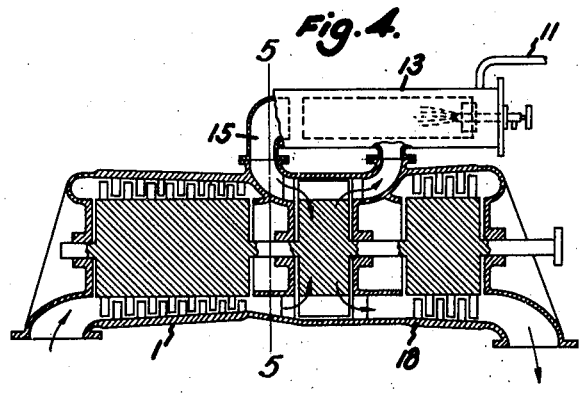
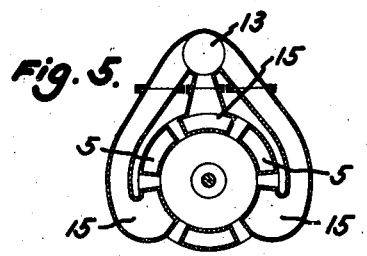
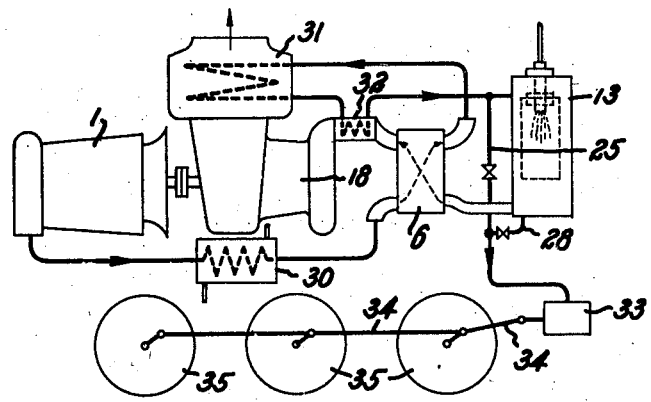
Inventor:
Claude Seippel,
By Pierce & Scheffler,
Attorneys.

Patented Feb. 8, 1949

2,461,186

UNITED STATES PATENT OFFICE 2,461,186

GAS TURBINE INSTALLATION

Claude Seippel, Ennetbaden, Switzerland, assignor to Aktiengesellschaft Brown, Boveri & Cie, Baden, Switzerland Application March 16, 1943, Serial No. 479,369
In Switzerland February 20, 1942

Section 1, Public Law 690, August 8, 1946
Patent expires February 20, 1962

13 Claims. (Cl. 60—41)

This invention relates to combustion gas turbine plants of the type in which the gas turbine drives a compressor for force air into a combustion chamber in which fuel is burned to develop the gaseous pressure medium that drives the turbine. This type of turbine plant was first proposed many years ago but the construction of operative turbine plants was delayed until recent years as the gas turbines and air compressors previously available were of such low efficiency that the power required for driving the air compressor exceeded the power output of the turbine.

The efficiency of the air compression is of paramount importance as regards the practical results which can be obtained with a gas turbine. It is therefore an advantage to use turbo-compressors for this purpose, especially of the axial type, because these attain a very high efficiency.

It is known to compress the air in a so-called cell-runner pressure exchanger which combines compression of the air with expansion of the combustion gases. The cells of the pressure exchanger trap the air which is to be compressed from a space which is under a higher pressure and sluice out the working gas which is to be expanded into another space.

The gas turbine installation according to the present invention consists of the combination of a turbo-machine with at least one cell-runner pressure exchanger for the upper stage. The advantage of this combination is that with the cell-runner pressure exchanger higher compression pressures can be obtained in a more economical manner than if the entire compression is accomplished solely by means of turbo-compressors. Cell-runner pressure exchangers have namely the advantage that compression and expansion are effected in the same machine. Furthermore they are mechanically simpler than turbo-compressors, can be used for much higher temperatures than ordinary gas turbines and also enable relatively small volumes to be dealt with at a high efficiency thus making them very suitable for a high-pressure stage.

Constructional examples of the invention are illustrated diagrammatically in the accompanying drawing where:

Fig. 4 shows a further modified form of the installation shown in Fig. 3,

Fig. 5 shows a cross-section on the line 5—5 of Fig. 4 and

Fig. 6 shows a gas turbine installation for use in a locomotive.

Figure 1:
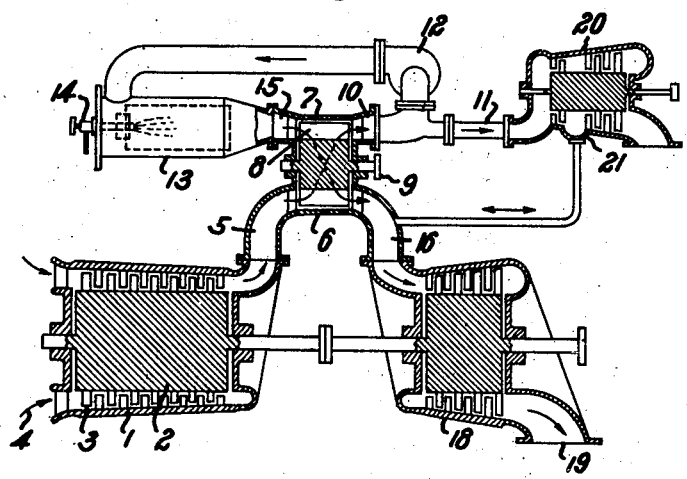
Fig. 1 shows a gas turbine installation in longitudinal section.
Figure 2:
Fig. 2 shows a cross-section of the pressure exchanger of Fig. 1.

In Fig. 1 which shows in diagrammatic form a gas turbine installation mostly in sectional view, 1 represents a pre-compressor constructed as a multi-stage axial blower with the rotor 2; 3 are the first blade rows. Air enters at 4 and passes at the point 5 to the cell-runner pressure exchanger 6, subsequently briefly referred to as the pressure exchanger. Fig. 2 shows a cross-sectional view of the pressure exchanger, which consists of the housing 7 and the cell-runner 8 of known type with a plurality of helically arranged blades. The runner can be rotated by the shaft 9 or kept in rotation by the air and gas flow. The air entering at 5 is trapped in the cells and conveyed to the opposite side of the housing, where it emerges at 10.

Part of the compressed air flows through conduit 11 to the turbine 20 where it is employed for doing useful work whilst the remaining part of the air is conveyed by the fan 12 to the combustion chamber 13 where it supplies the necessary oxygen in the form of combustion air for the fuel supplied at 14 and also an additional quantity that serves as cooling air flowing around the combustion chamber, finally mixing with the combustion gases at the end of the combustion chamber. This stream enters the pressure exchanger 6 at 15 where it is pre-expanded, and then emerges from the pressure exchanger at 16, being finally expanded in the turbine 18, and subsequently escaping to the atmosphere at 19 or being employed further in a heat exchanger.

The turbine 20 is of the multistage type and has an interstage section or bleeding point 21 which is connected with the gas discharge conduit 16 from the pressure exchanger 6. For the purpose of a correct power distribution air can either flow from the turbine 20 to the compressor set or gas can pass in the opposite direction, as indicated by the double arrow in the figure.

Figure 3:
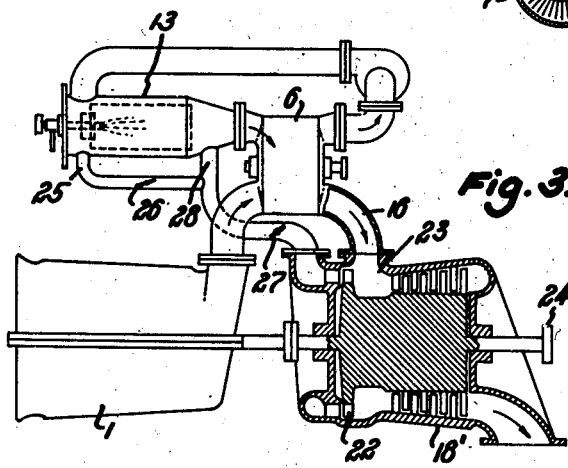
Fig. 3 shows a modified form of the invention.

Fig. 3 illustrates a further application of the invention. The installation illustrated comprises again a turbo-compressor 1', a pressure exchanger 6, a combustion chamber 13 and a turbine 18'. Instead of as in Fig. 1 extracting useful air at 11, in this case combustion gas is by-passed at 28 and supplied to a preliminary stage 22 of the turbine 18'. In the space 23 the gas which is taken away at 28 mixes with the portion which flows through the pressure exchanger and together with this latter performs work in the lower stages. The useful work done by the plant is obtained at the shaft 24.

By extracting air at 25 the temperature of the gases tapped off at 28 can be reduced to a value which is allowable for the turbine. The temperature can be regulated by means of a valve 26. The gases which flow in at 16 can be hotter than those coming from the high pressure portion 22 so that the gases of the preliminary stage 22 are subjected to an intermediate heating. The partial amount flowing through the high pressure part of the turbine can be regulated by an element 27 which can be in the form of a throttle valve, nozzle valve, rotatable guide blade and the like. The high pressure part of the turbine can consist of one or more stages. It can be located in the main casing or in a separate casing.

With the arrangement illustrated in Fig. 4 the compressor 1, pressure exchanger 6 and turbine 18 are arranged on the same shaft. Fig. 5 shows a cross-section on the line 5—5 in Fig. 4. Air passes through the three conduits 5 from the pre-compressor 1 into the runner of the pressure exchanger 6. In contrast to the arrangement previously described each cell of the pressure exchanger passes through the compression and expansion cycle three times during a revolution. The air enters the combustion chamber 13 and the gases or part of the gases pass through the three conduits 15 back to the pressure exchanger 6. Dividing the circumference in the pressure exchanger into several working cycles has the advantage that the radial forces acting on the runner are balanced.

Fig. 6 shows a power installation according to the invention for a locomotive. The air is pre-compressed in the compressor 1, cooled in an intermediate cooler 30, further compressed in the pressure exchanger 6 and heated in the exhaust gas preheater 31. Due to the high gas temperatures which the pressure exchanger can stand the air can be further heated at 32 by the gases which leave the pressure exchanger. Part of the gases or the air is extracted at 28 or 25 and passed to the working cylinder 33 of the locomotive.

The invention can of course also be realized in practice in a variety of other ways. In addition to the advantages already mentioned, the following are also obtained.

The characteristic feature of the pressure exchanger is that comparatively cold air and hot gas are respectively compressed and expanded in the same runner. The runner thus attains a temperature which is the mean of the temperatures of the two media. This enables the pressure exchanger to be capable of working with very hot gases. An intermediate heating of the gases at the entrance to the low-pressure stage can thus be avoided.

A further feature of the pressure exchanger is that a certain amount of heat is transmitted from the hot gases to the colder air, whilst this heat flow is prevented when compressing and expanding in separate machines, as is the case in the low-pressure stage.

Heating the air at the low-pressure stage is, however, much more detrimental than at the high-pressure stage, because it either increases the work involved by the subsequent compression or necessitates the removal of this heat in an intermediate cooler. The heat received at the high-pressure stage on the other hand remains in the circuit.

The heat given off by the gases in the pressure exchanger appears at first sight to be a disadvantage because it reduces the working capacity of the turbine. The special properties of the pressure exchanger enable the temperature of gases entering the pressure exchanger, however, to be increased to such an extent that despite the heat which is given to the air the gases passing to the low-pressure stage still have the temperature required for the turbine, so that there is actually no disadvantage from this arrangement.

I claim:

1. A combustion gas turbine plant of the type including a combustion chamber, a turbine operating on combustion gases developed in said chamber, means for supplying fuel to said combustion chamber, and multi-stage compressor means for supplying compressed air to said combustion chamber; characterized by the fact that a high pressure stage of said compressor means and a preliminary expansion stage for combustion gases from said combustion chamber is constituted by a single cell-runner pressure exchanger comprising a relatively rotary cell-runner and housing therefor, said housing having a set of inlet and outlet openings for the air to be compressed and another set of inlet and outlet openings for the combustion gases to be expanded, said cell-runner including a cylindrical assembly of longitudinally extending cells into which air and combustion gases are alternately admitted and discharged during relative rotation of said cell-runner and said housing, passage means extend from said air inlet and outlet openings to connect the pressure exchanger between a low pressure stage of the compressor means and the combustion chamber, passage means connects the combustion chamber to the combustion gas inlet of the pressure exchanger, and passage means connects the combustion gas outlet of the pressure exchanger to said turbine.

2. A combustion gas turbine plant as recited in claim 1, wherein a low pressure stage of said compressor means is a turbo-compressor.

3. A combustion gas turbine plant as recited in claim 1, wherein a conduit extends from the air outlet of said pressure exchanger to a load device.

4. A combustion gas turbine plant as recited in claim 1, wherein a low pressure stage of said compressor means is driven by said turbine.

5. A combustion gas turbine plant as recited in claim 1, wherein a conduit extends from said combustion chamber to by-pass pressure fluid around said pressure exchanger to a point of use.

6. In a combustion gas turbine plant, a combustion chamber, means for supplying fuel to said chamber, a multistage air compressor means for supplying compressed air to said combustion chamber, a turbine having an inlet connected to said combustion chamber, a second turbine of multistage type having an inlet connected to the outlet of said multistage air compressor means, and a bleeder connection from an intermediate stage of said second turbine to the inlet of the first turbine.

7. In a combustion gas turbine plant as recited in claim 6, wherein a high pressure stage of said air compressor means comprises a cell-runner pressure exchanger and passage means connecting the same between the combustion chamber and the first turbine.

8. In a combustion gas turbine plant, a combustion chamber, means for supplying fuel to said combustion chamber, compressor means for supplying air to said combustion chamber, and a gas turbine connected to and driving at least one stage of said compressor means; a high pressure stage of said compressor means being constituted by a cell-runner pressure exchanger comprising a relatively rotary cell-runner and housing therefor, said housing having a set of inlet and outlet openings for the air to be compressed and another set of inlet and outlet openings for the combustion gases to be expanded, said cell-runner including a cylindrical assembly of longitudinally extending cells into which air and combustion gases are alternately admitted and discharged during relative rotation of said cell runner and said housing, passage means extend from said air inlet and outlet openings to connect the pressure exchanger between a low pressure stage of the compressor means and the combustion chamber, passage means connects the combustion chamber to the combustion gas inlet of the pressure exchanger, and passage means connects the combustion gas outlet of the pressure exchanger to said turbine.

9. In a combustion gas turbine plant, a combustion chamber, means for supplying fuel to said combustion chamber, compressor means including a low pressure turbo-compressor stage and a high pressure cell-runner pressure exchanger stage, multistage turbine means, conduit means for delivering combustion gases to an intermediate stage of said turbine means through said pressure exchanger, and conduit means connecting said combustion chamber to a low pressure stage of said turbine means to supply pressure gas thereto in by-pass relation to said pressure exchanger.

10. In a combustion gas turbine, the invention as recited in claim 9 wherein said second conduit means includes a valved connection to the compressed air inlet end of said combustion chamber.

11. In a combustion gas turbine, the invention as recited in claim 9 wherein said second conduit means includes a valved connection to the combustion gas outlet end of said combustion chamber.

12. In a combustion gas turbine, the invention as recited in claim 9 wherein said second conduit means includes valved connections to the compressed air inlet end and to the combustion gas outlet end of said combustion chamber.

13. A combustion gas turbine plant comprising a multistage air compressor and a turbine on a common shaft, a combustion chamber, means for supplying fuel to said combustion chamber, conduit means connecting the high pressure stage of said air compressor to said combustion chamber, and conduit means connecting said combustion chamber to the turbine to supply combustion gas thereto; the high pressure stage of said air compressor being a cell-runner pressure exchanger connected by said conduit means between said combustion chamber and respectively said turbine and a low pressure stage of said air compressor.

CLAUDE SEIPPEL.

REFERENCES CITED

The following references are of record in the file of this patent:

UNITED STATES PATENTS

| Number | Name | Date |
|---|---|---|
| 1,959,795 | Lysholm | May 22, 1934 |
| 2,095,991 | Lysholm | Oct. 19, 1937 |
| 2,318,905 | Traupel | May 1, 1943 |

FOREIGN PATENTS

| Number | Country | Date |
|---|---|---|
| 367,130 | Great Britain | Feb. 18, 1932 |